United States Patent Office 2,827,249
Patented Mar. 18, 1958

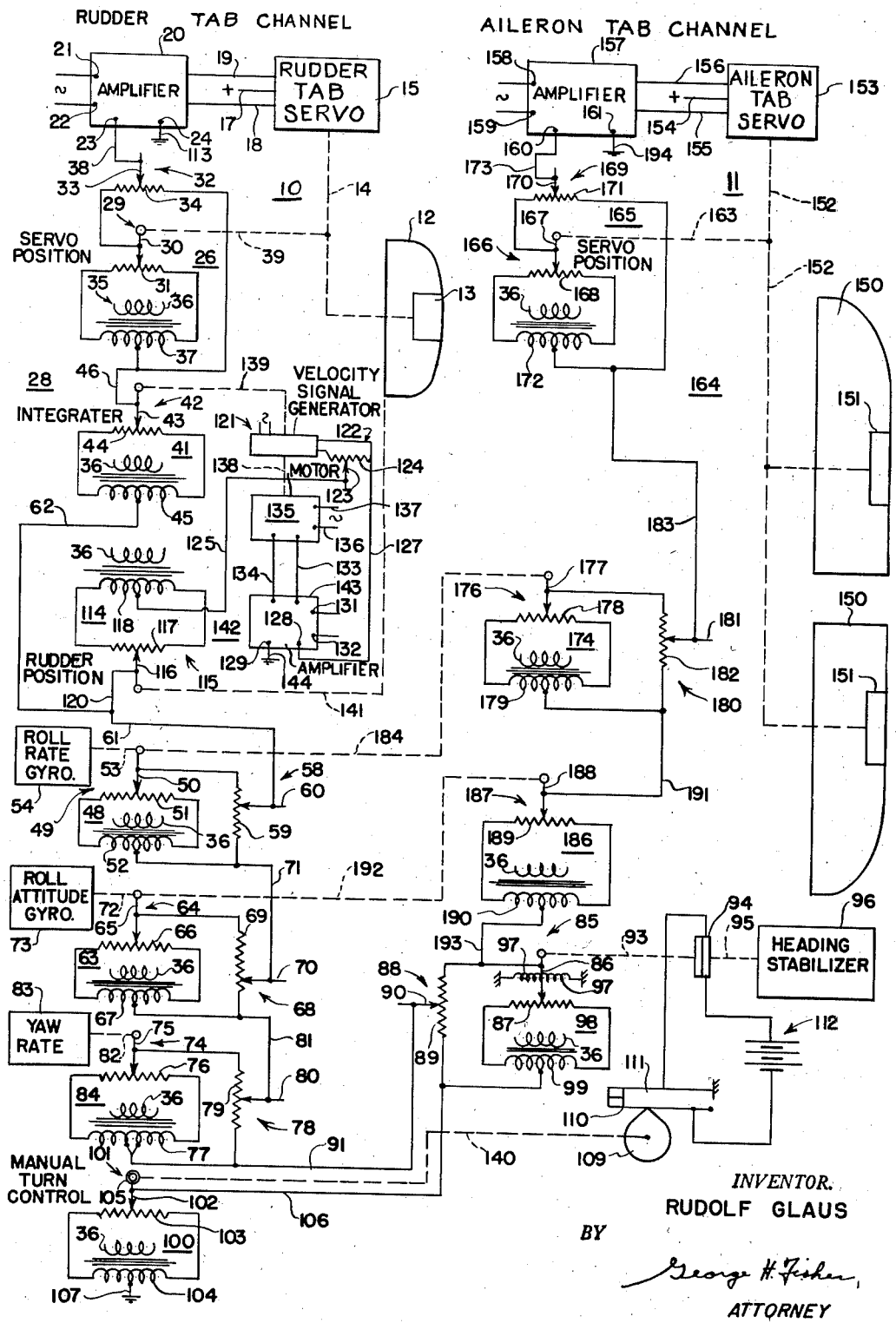

2,827,249

AUTOMATIC PILOTS

Rudolf Glaus, Minneapolis, Minn., assignor to Minneapolis-Honeywell Regulator Company, Minneapolis, Minn., a corporation of Delaware Application September 2, 1952, Serial No. 307,517

11 Claims. (Cl. 244—77)

The present invention pertains to automatic pilots for aircraft and more particularly to automatic pilots having means for displacing the ailerons and rudder simultaneously as when executing a coordinated turn. Automatic pilots for aircraft generally include a heading stabilizing device such as a directional gyroscope which establishes a heading reference, and the gyroscope on changes in the heading due to a transient disturbance operates simultaneously the rudder and ailerons of the aircraft to restore the craft to its original heading with the aircraft executing a coordinated turn. Such automatic pilots may include a manually operable arrangement for changing heading of the aircraft during which time the directional gyroscope is rendered ineffective to oppose such change in heading. Such manually operable arrangement also controls both the rudder and ailerons in order to effect a coordinated turn.

Execution of coordinated turns, either when the heading stabilizer correct for a change due to a disturbance or when a manually initiated change in heading is to be executed to provide for the resumption of the original heading or the new heading, as the case may be, is not easily accomplished. In some instances, when the aircraft is being stabilized on a given heading, by operation of the ailerons and rudder and also when a new heading is to be maintained, the aircraft instead of maintaining a stable heading in each instance actually undergoes repeated motions about the heading which collectively are termed "Dutch roll" oscillations. In some instances, these oscillations become divergent or increase to such an extent that the automatic pilot has to be disconnected from the aircraft control surfaces and such control surfaces are then manually operated. In some instances also while these oscillations may not become divergent, they approach a steady state value of low magnitude which may render the flight of the aircraft uncomfortable to those on said craft.

As an aid to an understanding of the invention, we will briefly consider "Dutch roll" oscillations.

"Dutch roll" motions or oscillations of an aircraft consist of alternate rolling, yawing, and sideslipping motions of the craft to the right and left. These motions are considered as free directional oscillations. For most aircraft these motions are poorly damped with the primary damping force originating from the fixed vertical elements of the tail surfaces. The motion may be initiated by operation of the rudder to one side followed by its immediate release or by a transient disturbance applied to the craft about the yaw axis. In some aircraft, when an automatic pilot having conventional aileron operation, but not also desired rudder operation in response to a heading sensing controller is used in an effort to stabilize the heading of the craft, transient disturbance about the yaw axis which affect the heading sensing controller may result in gradually increasing directional oscillations thereof which necessitate disconnecting the automatic pilot from the ailerons.

Where the heading responsive controller, controls both the ailerons and rudder, an aircraft may still undergo "Dutch roll" oscillations as the result of an arbitrary disturbance such as a heading disturbance. In this case the oscillations may be due to the failure to coordinate the operation of the ailerons and rudder from the heading sensing controller. In some instances, rudder servo tab operation is relied on to secure by aerodynamic loading the operation of the main rudder surface. For small deviations the tab is given only a small displacement and this provides an aerodynamic loading insufficient to overcome the frictional resistance or similar loading of the main rudder surface. Without rudder displacement, but with aileron displacement, the craft begins to oscillate in an increasing magnitude until the increased directional oscillation attains such magnitude so that the rudder servo tab is displaced sufficiently to overcome the effect of the frictional resistance of the rudder. With the rudder displaced only after a significant heading change, the craft settles down in continual oscillations of limited value. It is desired that these oscillations be prevented or at least damped, and the present invention accomplishes this object by effecting the positioning of the rudder servo tab in accordance with the sum of the integral with respect to time of the combination of both the magnitude of the heading sensing controller response and extent of rudder displacement and the magnitude of the heading sensing controller response.

The present invention has as its object an improvement in the automatic pilot to decrease the tendency of the aircraft to undergo "Dutch roll" oscillations while in flight.

A further object of this invention is to insure the operation of the rudder as well as the ailerons during changes in heading of the aircraft to reduce the tendency of the aircraft to undergo "Dutch roll" oscillations while in flight.

A further object of this invention is to operate the ailerons and rudder of an aircraft in proportion to the magnitude and direction of change of heading of an aircraft and further to also position said rudder in accordance with a time integration of such heading change signal.

It is a further object of this invention to position a servo tab of a main control surface in proportion to the magnitude of change of heading and further simultaneously position said tab in accordance with the integral in respect to time of the heading change signal so that initial small movements of the trim tab for small heading changes which might be insufficient to overcome the resistance of the control surface are reinforced or increased until the tab is further positioned to overcome such resistance.

It is a further object of this invention to apply heading correction signals to both the aileron and rudder channels of an automatic pilot and further to integrate such heading correction signals and apply such integrated signal to the rudder channel to insure the changes in heading of the aircraft are performed both by the operation of the ailerons and the operation of the rudder.

The above and other objects of the invention will appear more clearly hereinafter upon a consideration of the following description taken in conjunction with the accompanying drawings in which the sole figure shows a diagrammatic arrangement of an automatic pilot for operating the ailerons and rudder surfaces.

Referring to the drawing, there is disclosed generally therein an automatic pilot for securing operation of the rudder and aileron control surfaces of an aircraft. The automatic pilot thus includes two so-called channels, one being the rudder channel 10 and the other being the aileron channel 11. In the rudder channel, a main rudder control surface 12 includes a separately operable Flettner or servo tab 13. The tab 13 may be displaced relative to rudder surface 12 through a suitable operating means 14 driven by a rudder servo motor 15. The displaced servo tab 13 by means of aerodynamic loading effects the positioning of the main rudder surface 12. The rudder servo motor 15 may include clutching means which are selectively connected by conductor 17 for energization thereof to a source of D. C. voltage and when energized the clutching means serve to couple the rudder servo motor with the servo tab 13. The rudder servo motor includes alternative energizable means respectively connected to conductors 18 and 19 whereby the motor 15 may be operatively reversibly controlled.

The conductors 18 and 19 are alternatively energized from an A. C. discriminator amplifier 20. The amplifier includes A. C. control signal input terminals 23, 24 and A. C. power input terminals 21, 22. One or the other of the conductors 18 and 19 is energized depending upon the phase relationship of the alternating control signal across terminals 23, 24 with respect to the alternating voltage from the supply applied across terminals 21, 22. The servo motor-amplifier combination may be similar to that in Patent 2,425,733, dated August 19, 1947, to Willis H. Gille et al.

Alternating voltage control signals as stated are applied across the amplifier signal input terminals 23, 24 and are provided by a balanceable variable impedance main network 28. Network 28 comprises a servo motor rebalance network 26, an integration network 41, a roll rate network 48, a roll attitude network 63, a yaw rate network 84, a heading stabilizing network 98, and a manual turn control network 100.

Network 26 comprises a rebalance potentiometer 29 having a slider 20 and resistor 31, a ratio potentiometer 32 having a slider 33 and resistor 34, and a transformer 35 having a primary winding 36 and a secondary winding 37. Resistor 31 is connected across the secondary winding 37 of transformer 35. One end of resistor 34 is connected to slider 30 and the other end to a center tap of secondary winding 37. A conductor 38 extends from the adjustable slider 33 to amplifier terminal 23. Slider 30 is positioned along resistor 31 in either direction from the midpoint thereof through a suitable operating connection 39 from the rudder tab operative means 14. Slider 33 is manually adjusted along resistor 34 to select any desired ratio of the voltage between slider 30 and the center tap of secondary winding 37 due to the displacement of slider 30 relative thereto.

Network 41 comprises a potentiometer 42 having a slider 43 and resistor 44 with the resistor being connected across a secondary winding 45 of transformer 35. Since a single primary winding of a transformer may supply a plurality of secondary windings, the several independent networks are indicated as having a common primary winding for their secondary windings. A conductor 46 extends from slider 43 to the center tap of secondary winding 37 of network 26.

Network 48 comprises a roll rate potentiometer 49 having a slider 50 and a resistor 51, a secondary winding 52 of transformer 35, and a voltage dividing or ratio potentiometer 58 having a resistor 59 and slider 60. Resistor 51 is connected across the secondary winding 52. Resistor 59 is connected between slider 50 and a center tap of secondary winding 52. Conductors 61 and 62 in the series extend from adjustable slider 60 to a center tap of secondary winding 45 of network 41. Slider 50 is adjusted along resistor 51 in either direction from the midpoint thereof through a suitable operation connection 53 extending from a roll rate gyroscope 54.

Network 63 comprises a roll attitude potentiometer 64 having a slider 65 and a resistor 66, a secondary winding 67 of transformer 35, and a ratio or turn control coordination potentiometer 68 having a resistor 69 and slider 70. Resistor 66 is connected across the secondary winding 67. Resistor 69 is connected across slider 65 and a center tap of secondary winding 67. A conductor 71 extends from the manually adjustable slider 70 to the center tap of secondary winding 52 of network 48. Slider 65 is adjusted along resistor 66 in either direction from the midpoint thereof through suitable operating connection 72 from a roll attitude gyroscope 73.

Network 84 comprises a yaw rate potentiometer 74 having a slider 75 and a resistor 76, a secondary winding 77 of transformer 35, and a yaw rate coordination potentiometer 78 having a resistor 79 and slider 80. Resistor 76 is connected across the secondary winding 77. Resistor 79 is connected across slider 75 and a center tap of secondary winding 77. A conductor 81 extends from the manually adjustable slider 80 to the center tap of secondary winding 67 of network 63. Slider 75 is positioned in either direction from the center of resistor 76 through a suitable operating connection 82 from a yaw rate gyroscope 83.

Heading stabilizing network 98 comprises a heading control potentiometer 85 having a slider 86 and a resistor 87, a rudder gain potentiometer 88 having a resistor 89 and slider 90, and a secondary winding 99 of transformer 35. Resistor 87 is connected across the secondary winding 99. Resistor 89 is connected across the slider 86 and a center tap of secondary winding 99. A conductor 91 extends from the manually adjustable slider 90 to the center tap of secondary winding 77 of network 84. Slider 86 is positioned along resistor 87 in either direction from the midpoint thereof through a suitable operating means consisting of operating member 93, magnetic clutch 94, and operating member 95. The operating member 95 is positioned from a heading stabilizer 96 upon changes in heading of the aircraft during stabilized flight. The slider 86 is provided with centering springs 97, 97 which restore the slider 86 to the center of resistor 87 upon the deenergization of the magnetic clutch 94.

Network 100 comprises the manually operable turn control potentiometer 101 having a slider 102 and resistor 103 which is connected across a secondary winding 104 of transformer 35. A conductor 106 is connected from slider 102 to the center tap of secondary winding 99. A conductor 107 extends between a center tap of secondary winding 104 and ground, which ground is common to the ground of conductor 113 extending from the other amplifier signal input terminal 24. Slider 102 is selectively positioned by a manually operable turn control knob 105. The turn control knob 105 during operation of slider 102 also through a suitable operating connection 140 rotates a cam 109. With the slider 102 in its normal centered position a high point of cam 109 maintains two switch contacts 110, 111 in circuit closing position. Upon rotation of the cam 109 with movement of the turn control knob 105, the contacts 110 and 111 separate. The contacts 110 and 111 complete a circuit through the magnetic clutch 94 from a source of D. C. voltage such as a battery 112.

The operating means for slider 43 of network 41 will now be considered. In series with a portion of main network 28 is a rudder position network 114 and a control motor velocity signal voltage generator 121. Thus by the networks 100, 98, 84, 63, 48, 114, and the velocity signal generator 121 there is defined a second main variable impedance network 142. Network 114 comprises a rudder position potentiometer 115 having a slider 116 and resistor 117 which is connected across a secondary winding 118 of transformer 35. A conductor 120 extends from slider 116 to the junction of conductors 61 and 62. Slider 116 is positioned along resistor 117 through an operating connection 141 from the rudder control surface 12. Velocity signal generator 121 is of the type well known in the art having a primary winding and a secondary winding with the secondary winding inductively linked to the primary winding during the rotation of a rotor in said generator. The magnitude of the voltage induced in the secondary winding depends upon the speed of rotation of the rotor of said generator. The primary winding is connected to the source of alternating voltage which also energizes the primary winding 36 of transformer 35. The velocity signal generator thus may be similar to that disclosed in Figure 2 of the patent to Schoeppel et al. 2,524,998 or like that in Patent 2,553,597 to Maroni, Figure 2. Across the output terminals of the velocity signal generator secondary winding is a voltage dividing potentiometer 122 having a slider 123 and resistor 124. The slider 123 has extending therefrom a conductor 125 connected to a center tap of secondary winding 118. A conductor 127 extends from one end of voltage dividing resistor 124 to a signal input terminal 128 of a control motor amplifier 143. The amplifier 143 includes a further signal input terminal 129 and a conductor 144 extends therefrom to ground which is common to the ground terminal 107 of main network 28. The amplifier 143 includes A. C. power input terminals 131, 132 which are connected to the alternating voltage supply.

Associated with amplifier 143 is a control motor 135. Motor 135 may be a capacitor induction type having a line winding and an amplifier control winding. The line winding is connected to the source of alternating voltage by conductors 136, 137. The motor amplifier winding is connected by conductors 133, 134 to the output of amplifier 143. The amplifier 143 is of the A. C. discriminator type and the amplifier winding of motor 135 is energized in quadrature relationship relative to the energization of the line winding thereof depending upon the phase relationship of an alternating voltage signal across amplifier terminals 128, 129 relative to the alternating voltage from the supply applied across amplifier terminals 131, 132. Such forms of amplifier-motor combinations are well known in the art and may be similar to that disclosed in the patent to Schoeppel et al. above, in Figure 2.

The motor 135 through its output shaft 138 drives the rotor of the velocity signal generator 121 and through a further operating means 139 positions slider 43 relative to resistor 44.

The roll rate gyroscope 54 that operates slider 50 of network 48 is of the type well known in the art. This gyroscope has a rotor which has two axes of angular freedom with motion about one axis resisted by spring or other suitable restraining means. The arrangement is such that the displacement of slider 50 relative to resistor 51 both in magnitude and direction depend upon the direction and rate of roll of the aircraft.

The gyroscope 73 positioning slider 65 of network 63 is also the type well known in the art. This gyroscope has a rotor carried for rotation about a vertical spin axis in a casing which in turn is carried on a cross gimbal support for rotation about two respectively perpendicular horizontal axes. The arrangement is such that as a craft tilts about the roll axis slider 65 is moved relative to resistor 66 in a direction and amount depending upon the direction and amount of attitude change of the aircraft.

The gyroscope 83 that positions slider 75 is similar to the roll rate gyroscope 54. While these gyroscopes may be similar, their mounting in the aircraft will differ and thus the gyroscope 83 is so mounted that slider 75 is displaced relative to resistor 76 in accordance with the direction and rate of change of yaw or heading of the aircraft.

The heading stabilizer 96 may be a directional gyroscope which conventionally has a rotor supported for rotation about a horizontal spin axis in a casing which in turn is carried in an outer gimbal ring vertically situated, the casing being mounted so as to be rotatable about a horizontal axis in the vertical gimbal ring. The vertical gimbal ring is rotatable about a vertical axis, and its movement is transmitted through the operating member 95, clutch 95, member 93 to slider 86. The arrangement is such that as the aircraft deviates from a selected heading, the slider 86 is displaced relative to resistor 87 in accordance with the direction of change of heading and its extent of movement is proportional to the magnitude of the change.

In the aileron channel 11, the aileron control surfaces 150, 150 are provided with servo tabs 151, 151 which are operated by a suitable operating means 152 from the aileron servomotor 153. The aileron servomotor has three input conductors 154, 155, 156 with conductor 154 being selectively energized from a source of D. C. voltage and serving to couple or operatively connect the servomotor 153 with the servo tabs 151, 151. The conductors 155 and 156 are alternatively energized from an aileron amplifier 157. This alternative energization of conductors 155, 156 provides for reversible rotation of the servomotor 153. The amplifier 157 is of the A. C. discriminator type, and the amplifier-servomotor combination in the aileron channel is similar to that provided in the rudder channel. Amplifier 157 includes power input terminals 158, 159 connected to the source of alternating voltage. Amplifier 157 includes signal input terminals 160, 161 which are connected to a balanceable variable impedance main network 164 which is the source of control signals.

Balanceable main network 164 comprises a follow-up network 165, a roll rate network 174, a roll attitude network 186, a stabilizing network 98, and the manual turn control network 100. Network 165 comprises an aileron servomotor potentiometer 166 comprising a slider 167 and resistor 168; a ratio potentiometer 169 comprising a slider 170 and resistor 171; and a secondary winding 172 of transformer 35. Resistor 168 is connected across the secondary winding 172 of the transformer. Resistor 171 of potentiometer 169 is connected across slider 167 and a center tap of secondary winding 172 of the transformer. A conductor 173 extends from the manually adjustable slider 170 to amplifier signal input terminal 160. Slider 167 is positioned along resistor 168 in either direction from the center thereof by a suitable operating connection 163 driven by the aileron servo operated means 152.

Network 174 comprises a roll rate potentiometer 176 having a slider 177 and resistor 178; a secondary winding 179 of transformer 35; and a rate ratio potentiometer 180 having a slider 181 and resistor 182. Resistor 178 is connected across the secondary winding 179. Resistor 182 is connected across slider 177 and a center tap of secondary winding 179. A conductor 183 extends from the manually adjustable slider 181 to the center tap of secondary winding 172 in network 165. Slider 177 is positioned along resistor 178 in either direction from the center thereof by a suitable operating means 53, 184 driven from the roll rate gyroscope 54.

Network 186 comprises a roll attitude potentiometer 187 having a slider 188 and a resistor 189 and a secondary winding 190 of transformer 35. Resistor 189 is connected across the ends of secondary winding 190. A conductor 191 extends from slider 188 to the center tap of secondary winding 179 in network 174. Slider 188 is positioned along resistor 189 in either direction from the center thereof in accordance with the roll attitude of the aircraft by an operating means 72, 192 driven from the roll attitude gyroscope 73.

Networks 98 and 100 have been included in the description of the rudder channel 10. A conductor 193 extends from slider 86 in network 98 to a center tap of secondary winding 190 in network 186. The circuit of the main balanceable impedance network 164 is thus completed through networks 98 and 100 and through ground conductor 107 to ground conductor 194 connected to the other input terminal 161 of aileron amplifier 157.

While the apparatus is adapted to stabilize the aircraft on a selected heading and also stabilize the aircraft about its roll axis, it is primarily adapted to correct the "Dutch roll" oscillations of the aircraft. In one application of the apparatus wherein the aircraft involved has a period of ten seconds duration of oscillations, the arrangement of the control motor 135 and slider 43 of potentiometer 42 is such that but five seconds time is required for the motor to drive the slider to an end of the potentiometer resistor from its center point. The control motor 135 and its amplifier 143 are so related to the main control input circuit 142 through the control motor amplifier that the speed of operation of the motor 135 is proportional to the difference of the resultant voltage derived from networks 48, 63, 84, 98, and 100 and the rudder position voltage from network 114. The difference of the two voltages is opposed by the voltage from the velocity signal generator 121. The operation of the two-phase motor 135 is always maintained within the speed regulation characteristics of the motor and the velocity signal generator voltage tends to hold the motor speed proportional to the difference of the voltages from the networks referred to and which is applied to amplifier 143.

"Dutch roll" oscillations of the aircraft having low damping about the yaw axis at low air speeds arise primarily initially from a yawing movement of the aircraft induced by a disturbing force. These oscillations become divergent where solely aileron operation is applied to restore original heading due to the initial yaw. Since the oscillations do not develop where aileron and rudder operations are coordinated, it was deduced that when oscillations reached a steady value, that the rudder operation was faulty.

A consideration of this improper operation of the rudder with respect to the present apparatus would involve the omission of the integration network 41 and its potentiometer 42 since "Dutch roll" oscillations occurred during such configuration. During such consideration the slider 43 may be assumed at the center of resistor 44. The unbalance of the heading stabilizing network 98 resulting from the initial yawing of the craft would cause an unbalance of the main rudder channel network 28 and the main aileron channel network 164. The rudder amplifier 20 would respond to this unbalance of main network 28 and cause its rudder servomotor 15 to operate the servo tab 13 of rudder 12. At the same time the rudder servomotor through its follow-up connection 39 would position slider 30 with respect to resistor 31 so as to balance the main rudder network 28. As conventional, the unbalance of main network 164 would cause the operation of the aileron amplifier 157. Amplifier 157 would effect operation of the aileron servomotor 153. The servomotor 153 through the operating connection 152 would position aileron trim tabs 151, 151, and the aileron servomotor through its operating means 152, 163 would move slider 167 with respect to resistor 168 to rebalance the main network 164.

Considering the yawing of the aircraft with respect to the vertical axis thereof, the surfaces of the aircraft such as the rudder and vertical stabilizer which have a tendency to damp such yawing movements do not have the area to oppose yawing that the wings have to resist rolling of the aircraft, and thus the aircraft is more highly damped about the roll axis than about the yaw axis. Also, if the rudder surface 12 is not displaced in accordance with the heading error signals, it does not exert as great a damping moment on the motion of the aircraft as it would if it were displaced.

For a yawing motion of the aircraft of small magnitude only a small signal is provided in the rudder network 28. This small signal causes the operation of the rudder servomotor 15 and the servo tab 13, but this operation of the tab may be such a small displacement thereof that when the air stream operates on the displaced servo tab the moment resulting may not be sufficient to overcome the loading due to friction in the bearings associated with the rudder mechanism. Thus the rudder surface 12 may not be displaced during the small yawing of the craft, and its damping effect is merely that of a vertical surface and not a displaced vertical surface. With solely aileron operation to correct for the yaw, the craft begins to oscillate about the stabilized heading with the oscillations becoming divergent. When the oscillations as they increase reach such magnitude that the magnitude of yaw results in rudder operation, the oscillations no longer continue to be divergent but attain a steady value which oscillations are termed "Dutch roll oscillations." The aircraft continues its "Dutch roll oscillations" during flight.

The arrangement will be considered with the integration network 41 active in the rudder network 28. As the aircraft yaws initially, the heading stabilizer 96 as previously considered operates the slider 86 in network 98 to provide a corrective heading error signal. The signal is applied as before to aileron network 164 and also to the rudder network 28. The heading error signal also is applied through network 114 to the control motor amplifier 143. The unbalance of amplifier 143 operates the control motor 135 which operates at such a speed that the velocity signal generator voltage is substantially equal to the heading error voltage signal. The control motor 135 operates slider 43 with respect to resistor 44 so that a signal voltage is generated by network 41. This voltage from network 41 reinforces the heading error signal in network 28 and causes the amplifier 20 to additionally operate the rudder servomotor 15 so that the trim tab 13 is additionally displaced. This additional displacement of trim tab 13 may be sufficient to overcome the frictional resistance of the main rudder surface 12 and the rudder will be displaced. As thus displaced, the rudder will exert a greater damping moment on the yawing motion of the aircraft than it would if in normal position and thus prevent oscillations developing. It should be noted that the signal from generator 41 is continuously increasing so that a sufficient unbalance is provided in network 28 to assure that the trim tab 13 will be sufficiently displaced to cause operation of the main rudder 12. As the main rudder surface 12 moves it operates the slider 116 in network 114 to oppose the heading error signal voltage. When the voltage from network 114 equals the heading error voltage, the control motor amplifier 143 has its input network in a balanced condition from the displacement signals and the control motor 135 is no longer operated.

As the air speed of the aircraft increases, the period of oscillation of the aircraft if oscillations are present decreases slightly. During this shorter period of oscillation the control motor 135 and the integrator arrangement will not have a sufficient time to displace slider 43 an appreciable extent. Under these circumstances, the network 28 functions as if the integrator 41 were not present, and assumes a straight forward configuration similar to that of the aileron network 164. During this higher frequency or short period of oscillation, the magnitude of the oscillations are not as high as at the lower frequency or long period of oscillations of the aircraft. These high frequency oscillations therefore do not render uncomfortable the operation of the aircraft.

It has been shown that a dead spot exists in the system between the rudder servomotor and the main rudder surface. The effectiveness of this dead spot can be reduced by increasing the gain in the servo ahead of the dead spot. However, it is desirable to keep the overall gain which is the ratio of rudder displacement to rudder control voltages constant. Several configurations of rudder control systems were considered. Firstly, it was found that including with the servomotor follow-up or feedback voltage a combination of rudder displacement and rudder rate displacement feedback voltage only marginal stability could be expected. Secondly, also where the follow-up or feedback voltage consisted of mixing rudder displacement voltage and rudder servomotor displacement voltage only slight improvement over the first configuration was noted. The third and most advantageous arrangement of providing feedback to minimize "Dutch roll" is the subject of this disclosure using along with servomotor feedback an integral control based on a combination of rudder position voltage and heading error voltage wherein the rudder control voltages are provided by the sensing devices in the rudder bridge.

It will now be appreciated that I have provided an automatic pilot for an aircraft with a novel arrangement for control of the rudder of the aircraft which arrangement is especially effective to correct "Dutch roll" oscillations of the aircraft and which functions for low magnitude control signals to definitely secure operation of said rudder by an integration of a control signal and which operation of the rudder is also made directly responsive to the control signal.

I do not wish to restrict my invention to the precise embodiment disclosed, since modification of the particular details will now occur to others skilled in the field, but as defined by the following claims.

What is claimed is:

1. Control apparatus for an aircraft having aileron and rudder control surfaces each surface having a trim tab, said apparatus comprising: a heading control operated first signal generator, an aileron amplifier connected to said signal generator, a motor connected to said heading signal generator for positioning a second signal generator in accordance with the magnitude and duration of said heading signal generator operation, a follow-up third signal generator, a rudder trim tab servomotor amplifier connected to said three generators, a displaceable rudder trim tab servomotor operating said follow-up signal generator and connected to said amplifier to be controlled by said amplifier in accordance with the resultant of the operation of said three signal generators for positioning said rudder trim tab, and a second servomotor connected to said aileron amplifier for operating said aileron trim tab to insure coordination of the operation of ailerons and rudder surfaces during heading control.

2. In an automatic pilot for an aircraft having aileron surfaces and a rudder having a trim tab; a first voltage signal generator having an output proportional in magnitude to the change in aircraft heading; a second voltage signal generator positioned by and having an output varying in magnitude according to operation of the rudder of said craft; a control motor connected to the first and second signal generators responsive thereto and operated at a speed in accordance with the resultant of the difference in magnitudes of said first and second signals; a third voltage generator positioned from said control motor in accordance with the time integral of its rate of operation, a follow-up fourth voltage generator, a first servomotor connected to the first, third, and fourth voltage generators and operated in accordance with the resultant voltage of said first, third and fourth voltage generators and operating said follow-up generator, means driven by said first servomotor to displace the trim tab thus increasing the aerodynamic loading on the rudder to overcome resistance to its displacement, a second servomotor, a fifth voltage generator operated by said second servomotor, means connected to said second servomotor for controlling said second servomotor from said first and fifth voltage generators, and means driven by said second servomotor for effecting operation of said aileron surfaces whereby the operation of the first servomotor relative to the operation of the second servomotor for the same heading signal is increased by said control motor.

3. Control apparatus for an aircraft having a rudder surface provided with a trim tab displaceable from a normal position and thus subject to aerodynamic loading to displace the rudder, comprising: a servomotor adapted to position said trim tab; control means including a balanceable network connected to the servomotor for reversibly operating said motor in accordance with the direction of network unbalance, said network including a heading control signal voltage generator, a follow-up signal voltage generator driven by said servomotor, and an integration signal voltage generator for increasing the servomotor gain from the heading signal; a control motor operating said integration signal voltage generator; a rudder position voltage generator operated by the rudder; and operating means connected to the control motor responsive to the heading and rudder position generators for controlling said control motor speed in accordance with the sum of the voltages from the heading control generator and the rudder position generator to effect continued operation of the trim tab to increase the aerodynamic load thereon and thus increase the turning moment on said rudder thereby to insure rudder position change.

4. Control apparatus for an aircraft having rudder and aileron control surfaces each surface having a trim tab, said apparatus comprising: a first servomotor for operating said rudder trim tab; a servomotor for operating said aileron trim tab; a balanceable rudder network connected to the first servomotor for controlling said rudder trim tab servomotor; signal providing means connected to the network for controlling the balance of said network according to the angular change in craft heading, the extent of operation of said rudder trim tab servomotor, and the time integral of both the angular change in craft heading and rudder displacement; a balanceable aileron network for controlling said aileron trim tab servomotor; and heading responsive means and aileron trim tab servomotor position means connected to the aileron network for controlling said aileron network according to the change in craft heading and the extent of operation of said aileron trim tab servomotor, whereby the tendency otherwise of the craft to "Dutch roll" at low airspeeds because of no substantial rudder displacement is reduced by said integral control.

5. Control apparatus comprising: a servomotor displaceable, actuating means driven by the servomotor and connected to a condition controlling device, said actuating means on increase displacement increasing the force tending to operate said condition controlling device against resistive effects; control means for operating said motor; a balanceable network connected to the control means for operating said servo control means upon unbalance of the network, said network including a first voltage generator responsive to the magnitude of a change in said condition, a follow-up second voltage generator positioned by said servomotor in proportion to its displacement, and an integration third voltage signal generator; a control motor operating said integration signal generator; a fourth voltage generator operated in accordance with the displacement of said condition control device; and means connected to the control motor and responsive to the first and fourth generators and operated by the difference in the signals of said first and fourth generators for controlling the speed of operation of said control motor to increase the gain of the servomotor from said first signal to insure operation of said device.

6. Apparatus for positioning a control surface of an aircraft adapted when rotatably displaced to apply a turning moment to the craft, comprising: a servomotor, actuating means driven by the servomotor and adapted to position said surface through aerodynamic loading by variably oppositely rotatably deflecting a portion of the surface; a control means reversibly operating said servomotor; a balanceable voltage network connected to said control means so that the direction of unbalance of said network determines the direction of operation of said servomotor, said network including a signal voltage generator positioned according to the magnitude of a change in a condition of flight of said aircraft, a signal voltage generator positioned according to the magnitude of displacement of said servomotor, and an integration signal voltage generator; a further signal voltage generator operated by the surface in accordance with the control surface displacement; and means connected to the flight condition and further signal generators and controlled by the algebraic sum of the signals from said further generator and the change in aircraft flight condition generator and operating said integration generator at a rate determined by the sum to increase the algebraic gain of the servomotor from said condition change signal to insure operation of said surface proportionately thereto.

7. Apparatus for operating a condition controlling device comprising: a servomotor; means driven by the servomotor and adapted to position said device; means including a balanceable voltage network connected to the servomotor for controlling said servomotor, said network including a voltage generator responsive to the magnitude of change in the condition, a voltage generator operated by said servomotor proportional to its extent of operation, and an integration voltage generator; a control motor operating said integration generator in proportion to a time integral of the control motor speed; a motor velocity signal generator driven by said control motor; a further signal generator operated in accordance with the displacement of the condition control device; and control means connected to the control motor for operation thereof and responsive to the further signal generator, the velocity signal generator, and the condition change generator for controlling said control motor speed in accordance with the resultant of the voltages from the velocity signal generator, the condition change generator, and the control device position generator to increase the extent of operation of the servomotor derived from the condition change signal.

8. Apparatus for operating the rudder surface on an aircraft having a trim tab, said apparatus comprising: a servomotor adapted to operate said tab from a normal position whereby increase in operation thereof increases the force tending to displace said rudder surface; a voltage responsive control means connected to the servomotor for reversibly controlling said servomotor; a balanceable voltage network connected to said control means; signal voltage means responsive to magnitude and direction of change in aircraft attitude unbalancing said network; signal means driven by said servomotor proportional to its extent of operation for rebalancing said network; integration signal means for also affecting the balance of said network; a control motor operating said integration signal means; a control motor driven velocity voltage generator; a signal voltage generator driven by said rudder according to its displacement, and additional means connected to the control motor for control thereof and responsive to the attitude signal means, the velocity voltage generator, and rudder driven signal generator for controlling said control motor in accordance with the sum of the voltages of said attitude signal means, the motor velocity voltage, and the rudder displacement voltage.

9. Control apparatus for an aircraft having rudder and aileron control surfaces said rudder surface having a trim tab, said apparatus comprising: means including a servomotor adapted to position said ailerons; means including a servomotor adapted to position said rudder trim tab; a control means for said aileron servomotor and a control means for the rudder tab motor both control means including a craft heading signal controller for operating both servomotors an extent proportional to the operation of said controller; a signal controller in the rudder tab motor control means variable with the change in rudder position; and integrator operated signal providing means in said rudder tab servomotor control means responsive to the differential of said craft heading control signal and said rudder position signal and providing a time integration of the differential signal for modifying the position of said rudder tab servomotor to coordinate operation of the rudder and aileron surfaces during heading control of the craft.

10. Control apparatus for an aircraft having rudder and aileron control surfaces, said rudder surface having a trim tab effective through aerodynamic loading to displace the rudder, said apparatus comprising: means including a servomotor adapted to effect operation of said ailerons; a servomotor adapted to operate said rudder trim tab from a normal position into the airstream for aerodynamic loading and by such aerodynamic loading effect rudder displacement; a control means for the aileron servomotor and a control means for the rudder tab motor both control means including a craft heading signal generating controller for operating both servomotors an extent proportional to the operation of said heading controller; a feedback control signal variable with the rudder surface displacement; and integrating means in said control means for the rudder tab motor operable at a rate in accordance with the difference of said craft heading signal and said rudder displacement feedback signal for modifying the position of said rudder tab servomotor to further displace said trim tab to insure rudder surface displacement.

11. Control apparatus for an aircraft having a main rudder control surface including a trim tab separately operable therefrom and effective through aerodynamic loading to displace the rudder, said apparatus comprising: a servomotor adapted to directly position said trim tab; phase sensitive control means connected to the servomotor for reversibly operating said servomotor; balanceable means connected to the control means for energizing said control means including a signal providing controller responsive to change in craft attitude to effect operation of said tab servomotor proportional to the magnitude of response of said controller; a rudder position signal providing controller positioned according to displacement of said main control surface; and integration means in said balanceable means providing a third signal and responsive to the differential effects of the signals of said attitude and rudder position controllers for modifying the position of said trim tab to effect continued operation of the trim tab and thus increased aerodynamic loading to insure rudder surface displacement.

References Cited in the file of this patent

UNITED STATES PATENTS

| | | |
|---|---|---|
| 1,574,567 | Flettner | Feb. 23, 1926 |
| 1,966,170 | Greene | July 10, 1934 |
| 2,045,579 | Carlson | June 30, 1936 |
| 2,432,036 | Noxon | Dec. 2, 1947 |
| 2,482,809 | Thompson | Sept. 27, 1949 |
| 2,492,252 | Wing | Dec. 27, 1949 |
| 2,513,537 | Williams | July 4, 1950 |
| 2,546,555 | Meredith et al. | Mar. 27, 1951 |
| 2,568,719 | Curry | Sept. 25, 1951 |
| 2,590,020 | Kutzler et al. | Mar. 18, 1952 |
| 2,594,326 | MacCallum | Apr. 29, 1952 |
| 2,632,142 | Chenery | Mar. 17, 1953 |